US012724863B2

(12) United States Patent
Finazzo et al.

(10) Patent No.: US 12,724,863 B2
(45) Date of Patent: Sep. 1, 2026

(54) TOKEN ISSUER MANAGER FOR MANAGEMENT AND DYNAMIC CHANGING OF TOKEN ISSUERS

(71) Applicant: Dell Products L.P., Round Rock, TX (US)

(72) Inventors: Ryan Christopher Finazzo, Yorba Linda, CA (US); Karimuthu Rengasamy, Lafayette, CO (US); Rui Shi, Irvine, CA (US); Gennady Bystritsky, Ladera Ranch, CA (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/915,698

(22) Filed: Oct. 15, 2024

(65) Prior Publication Data

US 2026/0105131 A1 Apr. 16, 2026

(51) Int. Cl.
*G06F 21/31* (2013.01)

(52) U.S. Cl.
CPC .................................... *G06F 21/31* (2013.01)

(58) Field of Classification Search
CPC .......... G06F 21/30; G06F 21/31; G06F 21/00; G06F 21/41; H04L 63/0807; H04L 9/3213; H04L 63/0823
See application file for complete search history.

(56) References Cited

U.S. PATENT DOCUMENTS

| | | | | |
|---|---|---|---|---|
| 10,613,938 | B2 * | 4/2020 | Blumenau | G06F 21/6218 |
| 10,691,659 | B2 * | 6/2020 | Blumenau | G06F 21/10 |
| 10,819,656 | B2 * | 10/2020 | Moldvai | H04L 47/781 |
| 11,418,343 | B2 * | 8/2022 | Elmenshawy | H04L 9/3213 |
| 11,811,679 | B2 * | 11/2023 | Elmenshawy | G06F 9/5077 |
| 12,088,584 | B2 * | 9/2024 | N | H04L 63/0853 |
| 12,204,766 | B2 * | 1/2025 | Mangaly | H04L 67/51 |
| 12,401,634 | B2 * | 8/2025 | Uzun | H04L 63/104 |
| 2024/0244058 | A1 * | 7/2024 | Smith | H04L 63/20 |

* cited by examiner

*Primary Examiner* — Hosuk Song
(74) *Attorney, Agent, or Firm* — Chamberlain, Hrdlicka, White, Williams & Aughtry; Aly Z. Dossa

(57) ABSTRACT

In general, certain embodiments described herein relate to a method for managing token issuers for a system. One or more embodiments are directed to changing the token issuer after a factory configuration, a disaster situation, and the current token issuer being compromised or down. The method for managing token issuers includes restoring a system on to a virtual machine environment based on a backup image of the system, identifying available token issuers on the virtual machine environment, determining that a currently configured token issuer on the system is not one of the available token issuers, and selecting, in response to the determining, a token issuer of the available token issuers. Finally, the method includes updating, by a token issuer manager executing on the system, a common IAM service of the system to use the token issuer to grant access to an application executing on the system.

17 Claims, 6 Drawing Sheets

TOKEN ISSUER MANAGER FOR MANAGEMENT AND DYNAMIC CHANGING OF TOKEN ISSUERS

BACKGROUND

To provide security to a system, tokens can be issued for authorization of applications running on the system. The tokens identify the applications as authorized to interact with other applications and data on the system. To issue these tokens, an identity access manager (IAM) service can be used to provide the applications with the tokens from token issuers. Many different token issuers may be used for various different reasons; however, many systems have only a single IAM service connecting applications to a single token issuer. If the single IAM service or the single token issuer fail or need to be changed, the system will face major disruptions.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
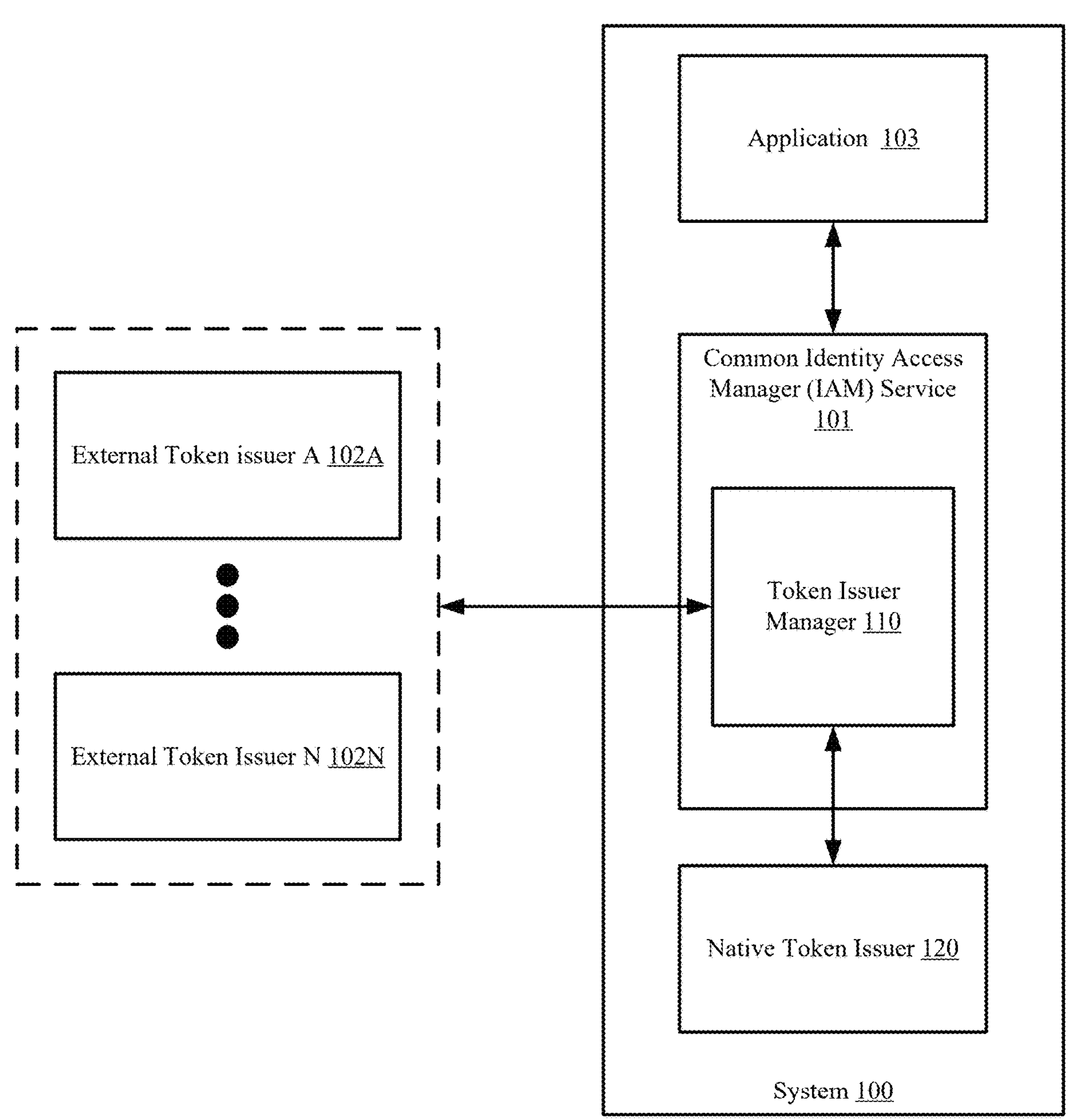
FIG. 1 shows a system in accordance with one or more embodiments of the invention.

In general, embodiments of the invention relate to a method of managing token issuers. More specifically, embodiments of the invention utilize a token issuer manager in a common identity access manager (IAM) service to dynamically change token issuers for a system. Tokens provide security to the system by being issued to applications running on the system. The tokens identify the applications as authorized to interact with other applications and data on the system. The common IAM service retrieves tokens from a token issuer to distribute to applications on a system. The token issuer manager makes it possible to change, in a common IAM service, the token issuer so the system can continue normal operations. The token issuer manager aids in reducing downtime and recovery costs from switching token issuers. The token issuer manager simplifies deployment operations of token issuers creating a flexible and resilient system.

In many traditional implementations, to issue tokens, a single IAM service connected to a single token issuer is used. The single IAM service retrieves tokens from the token issuer and distributes the tokens to applications on a system. The single IAM service and single token issuer operate in silos. This creates significant challenges with system flexibility. The system struggles when operating across diverse environments and disaster recovery scenarios. If the single IAM service or the single token issuer fails or needs to be changed, the system will face major disruptions. Failure of the single IAM service would necessitate the establishment of a completely new IAM service to connect to a different token issuer and restore normal operations and access to essential data. This process can be both costly and time-intensive. The process also presents significant issues with new deployment models, limiting the system's ability to recover swiftly and effectively after operational disruptions.

One or more embodiments of the invention are directed to changing the token issuer after initial factory configuration of the system. In the factory during an initial configuration of the system, a native token issuer is used. In traditional systems, once deployed as a production system, the user would use same native token issuer to gain initial access to the applications on the system and make initial installations. However, in various embodiments, the token issuer manager in the common IAM service allows the user to change to an approved token issuer prior to gaining initial access to the system.

One or more embodiments of the invention are directed to ensuring access to a token issuer after a disaster recovery. If a disaster takes a system offline, the system can be restored with critical data on a virtual machine environment. In traditional systems, the restored system would require the virtual machine implement the same single IAM service as pre-disaster. However, in various embodiments, the token issuer manager in the common IAM service allows for a change to an available token issuer that is available on the virtual machine environment.

One or more embodiments of the invention are directed to changing the token issuer after the token issuer is compromised. A compromised token issuer is a security threat to the system that requires immediate action. However, in various embodiments, the token issuer manager in the common IAM service allows for immediate action to secure the system. The token issuer manager changes token issuers from the compromised token issuer to a new secure token issuer and the common IAM service invalidates tokens from the compromised token issuer. This process secures the system.

One or more embodiments of the invention are directed to changing the token issuer when the token issuer is "down". When the token issuer is unresponsive, the token issuer cannot issue tokens leaving administrators and users of the system unable to execute critical functions. However, in various embodiments, the token issuer manager in the common IAM service allows for the token issuer to be changed to a new active token issuer enabling critical functions to continue in the system.

The following describes one or more embodiments.

FIG. 1 shows a system (100) in accordance with one or more embodiments of the invention. The system (100) may include a common identity access manager (IAM) service (101), an application (103), and a native token issuer (120). The system (100) is operatively connected to any number of external token issuer(s) (102A, 102N). Each component may be operatively connected to any of the other components via any combination of wired and/or wireless connections. Each component illustrated in FIG. 1 is discussed below. The system may include additional, fewer, and/or different components without departing from the invention. For example, in some embodiments the system (100) includes only one external token issuer, external token issuer A (102A).

Figure 5:
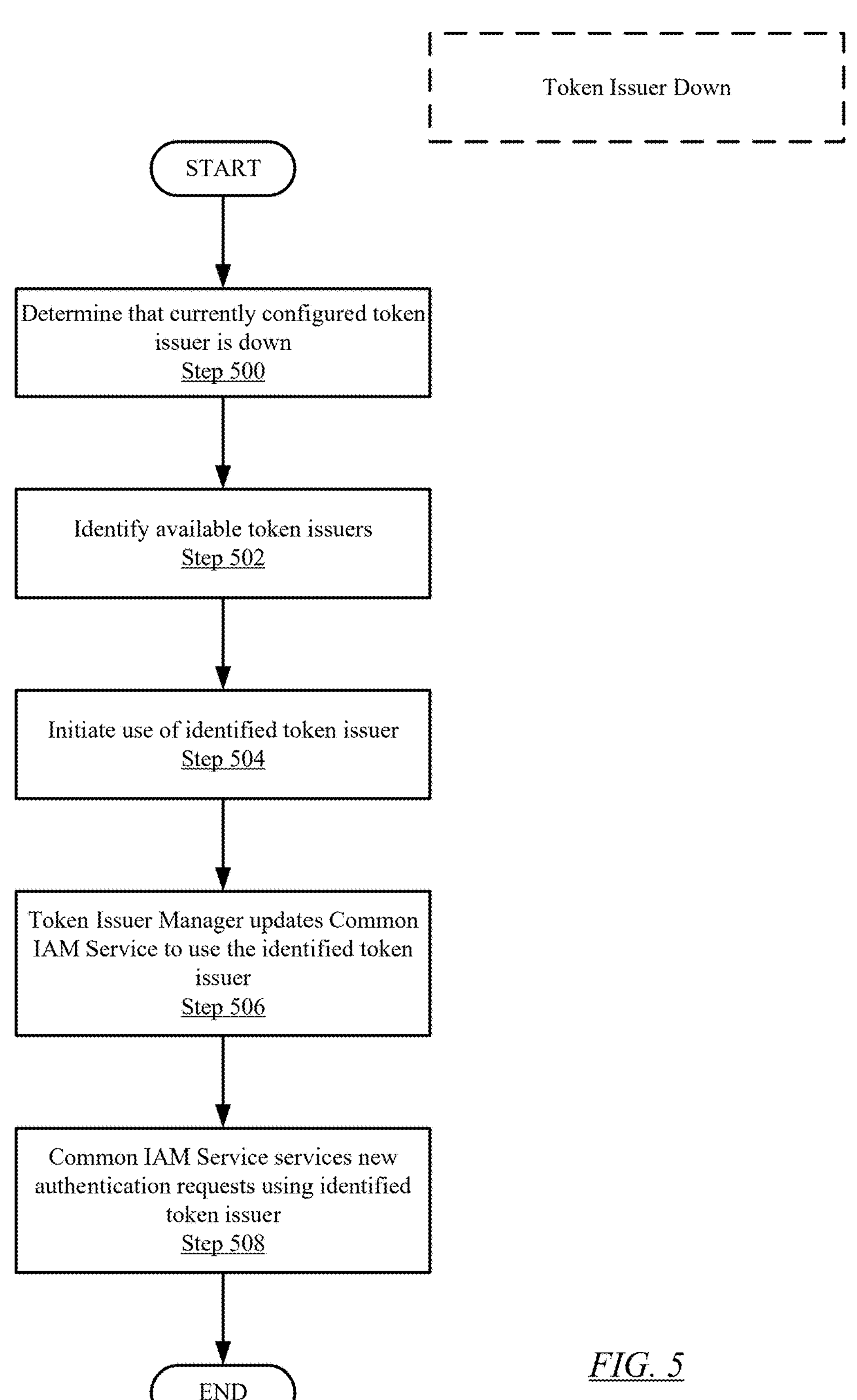
FIG. 5 shows a flowchart of a method for transferring token issuers in accordance with one or more embodiments of the invention.
Figure 6:
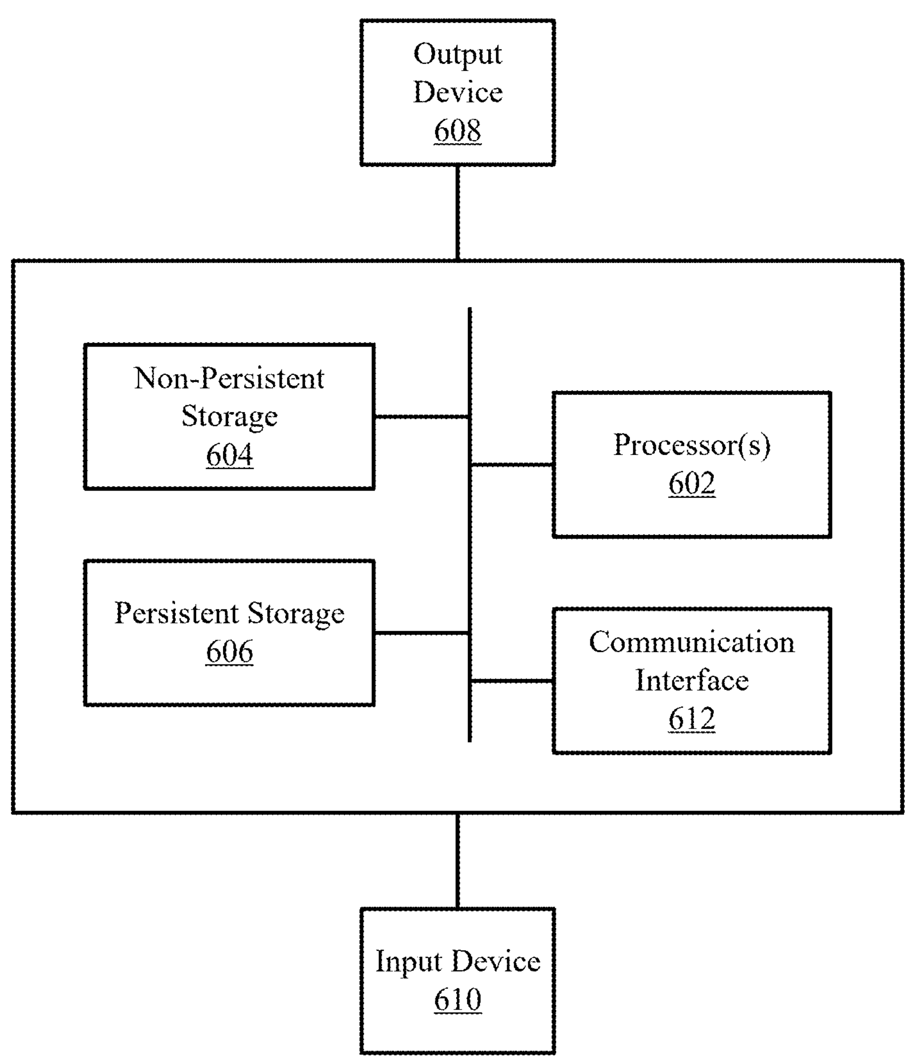
FIG. 6 shows a diagram of a computing device in accordance with one or more embodiments of the invention.

In one or more embodiments of the invention, the system (100) may be implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the system (100) described throughout this application and/or all, or a portion thereof, of the methods illustrated in FIGS. 2-5.

In one or more embodiments of the invention, the system (100) is implemented as a logical device. The logical device may utilize the computing resources of any number of computing devices and thereby provide the functionality of the system (100) described throughout this application and/or all, or a portion thereof, of the methods illustrated in FIGS. 2-5.

The common IAM service (101) acts as a common interface to shield applications (i.e., application (103)) from interactions with the token issuers. The common IAM service therefore allows for a change in the token issuer. The common IAM service (101) includes a token issuer manager (110). The token issuer manager is configured to interact with all token issuers (e.g., the external token issuer(s) (102A, 102N) and the native token issuer (120)). The token issuer manager (110) is initialized with information on a current token issuer. The token issuer manager (110) acts as a validation filter and is responsible for verifying the tokens sent in response to requests. The token issuer manager (110) uses a token validator set, which is sent from the token issuer, to validate the tokens. The token issuer manager (110) also delegates the authentication requests to the common IAM service (101). The token issuer manager (110) allows for the ability to switch between token issuers in response to current operational contexts of the system (100). This includes the ability to switch token issuers while the system (100) is restarted in a disaster recovery situation. The token issuer manager (110) is used to change token issuers as shown in FIGS. 2-5.

The token issuer manager (110) allows for easy connection to various different token issuers via the common IAM service (101). The common IAM service (101) acts as a stable interface between the application (103) and the token issuer. The common IAM service (101) can update the token issuer manager (110) to have a list of supported token issuers. The token issuer manager (110) allows the system (100) to be extended to support the use of a variety of token issuers. Regardless of security and system requirements, the token issuer manager (110) can be configured to provide reliable identity management across the system (100).

The application (103) is one of at least one applications running in the system 100. The application (103) requires authentication to access sensitive data and other applications on the system (100). The application (103) makes an authorization request for a token to the common IAM service (101). The token provides authentication to the application (103). The token, generated by a token issuer, is issued to the application (103) to provide the authentication. The application (103) uses the token to initiate requests on the system (100) on behalf of users. The requests may include requesting access to other applications, retrieving data from other applications, or making changes to other applications. The common IAM service (101) communicates any updates in the token issuer to the application (103) to make necessary changes to the authentication request allowing for seamless operation of the application (103) even during a change in the token issuer.

Figure 2:
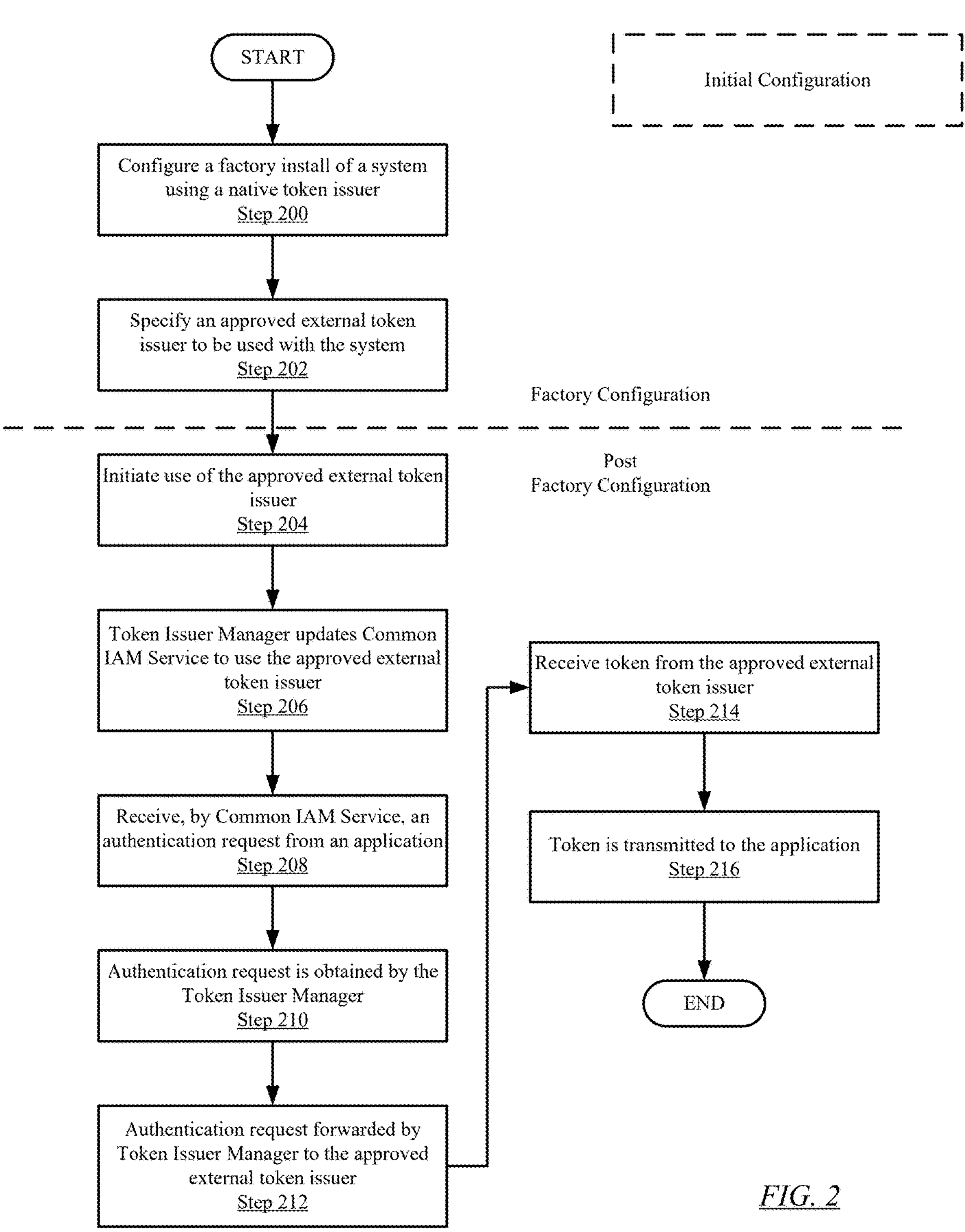
FIG. 2 shows a flowchart of a method for transferring token issuers after initial configuration of a system in accordance with one or more embodiments of the invention.
Figure 3:
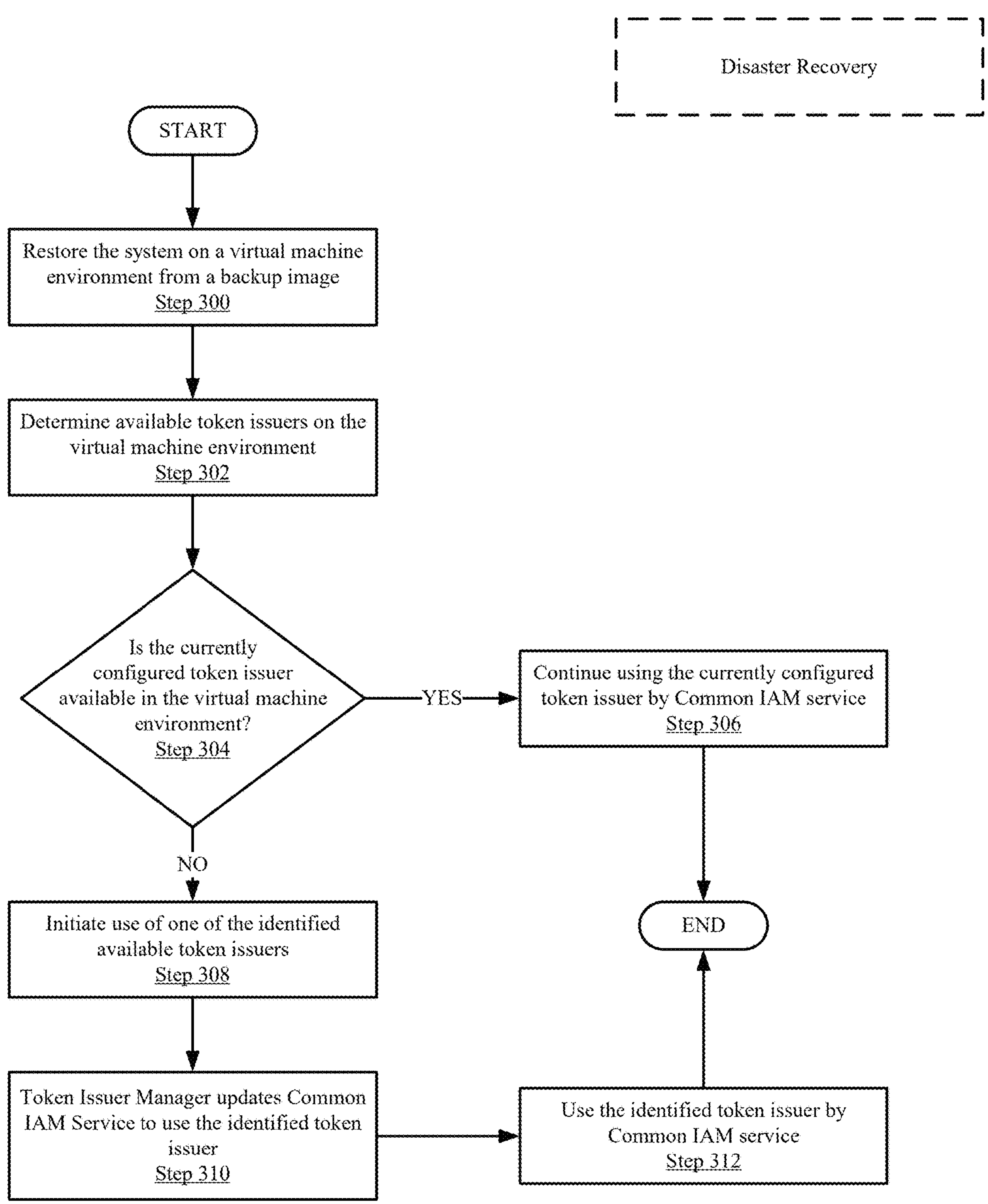
FIG. 3 shows a flowchart of a method for maintaining issuing tokens during disaster recovery in accordance with one or more embodiments of the invention.

The native token issuer (120) is an internal token issuer that can be used by the system (100). The native token issuer (120) is built into the system (100). The native token issuer (120) may be used during the initial configuration as shown in FIG. 2 and during a disaster recovery as shown in FIG. 3.

Turning to the external token issuer(s) (102A, 102N) shown in FIG. 1, the system may include any external token issuers (102A-102N) (e.g. external token issuer A (102A), external token issuer N (102N)). The external token issuers (102A-102N) are described below with reference to the external token issuer A (102A), but the description describes all clients including external token issuer N (102N). The external token issuer A (102A) can include any token issuer outside the system (100) that is compatible with the token issuer manager (110). These include, but are not limited to, open source token issuers and paid-service token issuers. The external token issuer A (102A) is operatively connected to the token issuer manager (110) to receive requests for tokens and to distribute tokens to the system (100).

The external token issuer(s) (102A, 102N) may be operatively connected to the system (100) via a network. In one or more embodiments, the network may be a local area network (LAN), a wide area network (WAN) such as the Internet, a mobile network, any other network type, or a combination thereof. Further, the network may encompass various interconnected, network-enabled subcomponents (or systems) (e.g., switches, routers, gateways, etc.) that may facilitate communications between the aforementioned components. Moreover, the external token issuer(s) (102A, 102N) and the system (100) may communicate with one another over the network using any combination of wired and/or wireless communication protocols.

In one or more embodiments of the invention, the external token issuer (102A, 102N) may be implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the external token issuer (102A, 102N) described throughout this application and/or all, or a portion thereof, of the methods illustrated in FIGS. 2-5.

In one or more embodiments of the invention, the external token issuer (102A, 102N) is implemented as a logical device. The logical device may utilize the computing resources of any number of computing devices and thereby provide the functionality of the external token issuer (102A, 102N) described throughout this application and/or all, or a portion thereof, of the methods illustrated in FIGS. 2-5.

FIG. 2 shows a flowchart of a method for transferring token issuers after initial configuration of a system in accordance with one or more embodiments of the invention. The method of FIG. 2 may be performed, in part, by, for example, the Common IAM service (e.g., 101, FIG. 1) and the token issuer manager (e.g., 110, FIG. 1). Other components of the system of FIG. 1 may perform all, or a portion, of the method of FIG. 2 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 2 may be performed in parallel with any other steps shown in FIG. 3-5 without departing from the scope of the invention.

Turning to FIG. 2, in step 200, a factory install of a system is configured using a native token issuer. The system may be the system (100) shown in FIG. 1. The native token issuer may be the native token issuer (120) as shown in FIG. 1. The factory install refers to a factory configuration that is installed on the system at the factory after manufacture of the system. The native token issuer allows factory configurations to be installed using applications in the system needing authentication.

In step 202, an approved external token issuer to be used with the system is specified. The approved external token issuer may be specified by a user of the system or can be specified by a manufacturer of the system. The approved external token issuer may be an external token issuer such as external token issuer A (e.g., 102A, FIG. 1). The approved external token issuer is specified at the factory so it can be initiated by the user upon the first use of the system. The approved external token issuer is not available on the system when the factory configuration is generated requiring the native token issuer to be used as shown in step 200.

In step 204, following the factory configuration, use of the approved external token issuer is initiated. The system leaves the factory and is received by the user. The user initiates use of the system which causes a token issuer manager in a common IAM service of the system to initiate changing the token issuer. The token issuer manager and the common IAM service may be the token issuer manager (110) and the common IAM service (101) as shown in FIG. 1.

In step 206, the token issuer manager updates the common IAM service to use the approved external token issuer. The token issuer manager establishes a connection with the approved external token issuer. The token issuer manager is then configured with the approved external token issuer. The token issuer manager switches an active token issuer from the native token issuer to the approved external token issuer and instructs the common IAM service to use the approved external token issuer.

In step 208, the common IAM service receives an authentication request from an application. The application may be the application (103) as shown in FIG. 1. The user activity on the system necessitates the application to need authentication to perform tasks. The common IAM service is set up to act as a stable interface between the approved external token issuer and the application. The application sends the authentication request to the common IAM service. The authentication request includes a request for a token for the active token issuer.

In step 210, the authentication request is obtained by the token issuer manager. The common IAM service sends the authentication request to the token issuer manager.

In step 212, the authentication request is forwarded by the token issuer manager to the approved external token issuer. The token issuer manager transmits the authentication request to the approved external token issuer via the connection established in step 206. The approved external token issuer receives the authentication request and creates a token.

In step 214, the token is received from the approved external token issuer. The approved external token issuer transmits the token to the common IAM service. The common IAM service identifies the token coming from the approved external token issuer. The token may be used to service the authentication request from the application.

In step 216, the token is transmitted to the application. The common IAM service transmits the token to the application. The application uses the token to perform tasks for the user. These tasks include user configuration of the system.

FIG. 3 shows a flowchart of a method for maintaining issuing tokens during disaster recovery in accordance with one or more embodiments of the invention. The method of FIG. 3 may be performed by, for example, the common IAM service (e.g., 101, FIG. 1) and the token issuer manager (e.g., 110, FIG. 1). Other components of the system of FIG. 1 may perform all, or a portion, of the method of FIG. 3 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 3 may be performed in parallel with any other steps shown in FIG. 2 and 4-5 without departing from the scope of the invention.

Turning to FIG. 3, in step 300, a system is restored on a virtual machine environment based on a backup image of the system. During use, the system is periodically backed up to a backup copy. During a disaster situation, the system is restored from the backup image to operate. The backup image is restored on the virtual machine environment as part of the disaster recovery. Because the virtual machine environment is used during the disaster recovery, the virtual machine environment may be smaller (i.e. lighter-weight) than the system prior to the disaster. Therefore, the virtual machine environment may not be able to handle all of the data for the system so critical data from the backup copy is prioritized.

In step 302, available token issuers on the virtual machine environment are determined. After the system is restored on the virtual machine environment, the token issuer manager identifies all available token issuers to the system. Some token issuers that were available before the disaster situation may not be available on the virtual machine environment. The token issuer manager identifies the available token issuers by determining if a connection can be established between the token issuer manager and the various token issuers.

In step 304, whether a currently configured token issuer is available in the virtual machine environment is determined. The token issuer manager determines if the currently configured token issuer before the disaster situation is one of the available token issuers on the system. The currently configured token issuer may be an external token issuer such as external token issuer A (e.g., 102A, FIG. 1). In one or more embodiments, the currently configured token issuer is the approved external token issuer as shown in FIG. 2. If the currently configured token issuer is available the method proceeds to step 306. If the currently configured token issuer is not available the method proceeds to step 308.

In step 306, use of the currently configured token issuer is continued by the common IAM service. Because the currently configured token issuer can be used on the system running on the virtual machine environment, there is no reason to switch the token issuer. New tokens are issued by the currently configured token issuer throughout the disaster recovery. The method ends after step 306.

In step 308, when the currently configured token issuers is not available, use of one of the identified available token issuers is initiated. Because the currently configured token issuer cannot be used on the system running on the virtual machine environment (or is otherwise unavailable), a new token issuer is selected. A token issuer is selected from one of the available token issuers. In one, the token issuer is the native token issuer. In an alternate embodiment, the token issuer is a second external token issuer.

In step 310, the token issuer manager updates the common IAM service to use the identified token issuer. The token issuer manager establishes a connection to the token issuer. The token issuer manager is then configured with the identified token issuer.

In step 312, the identified token issuer is used by the common IAM service. The token issuer is used by the common IAM service to grant access to applications executing on the system by issuing tokens as described in FIG. 2. The common IAM service is set up to act as a stable interface between the identified token issuer and the application. The method ends after step 312.

Figure 4:
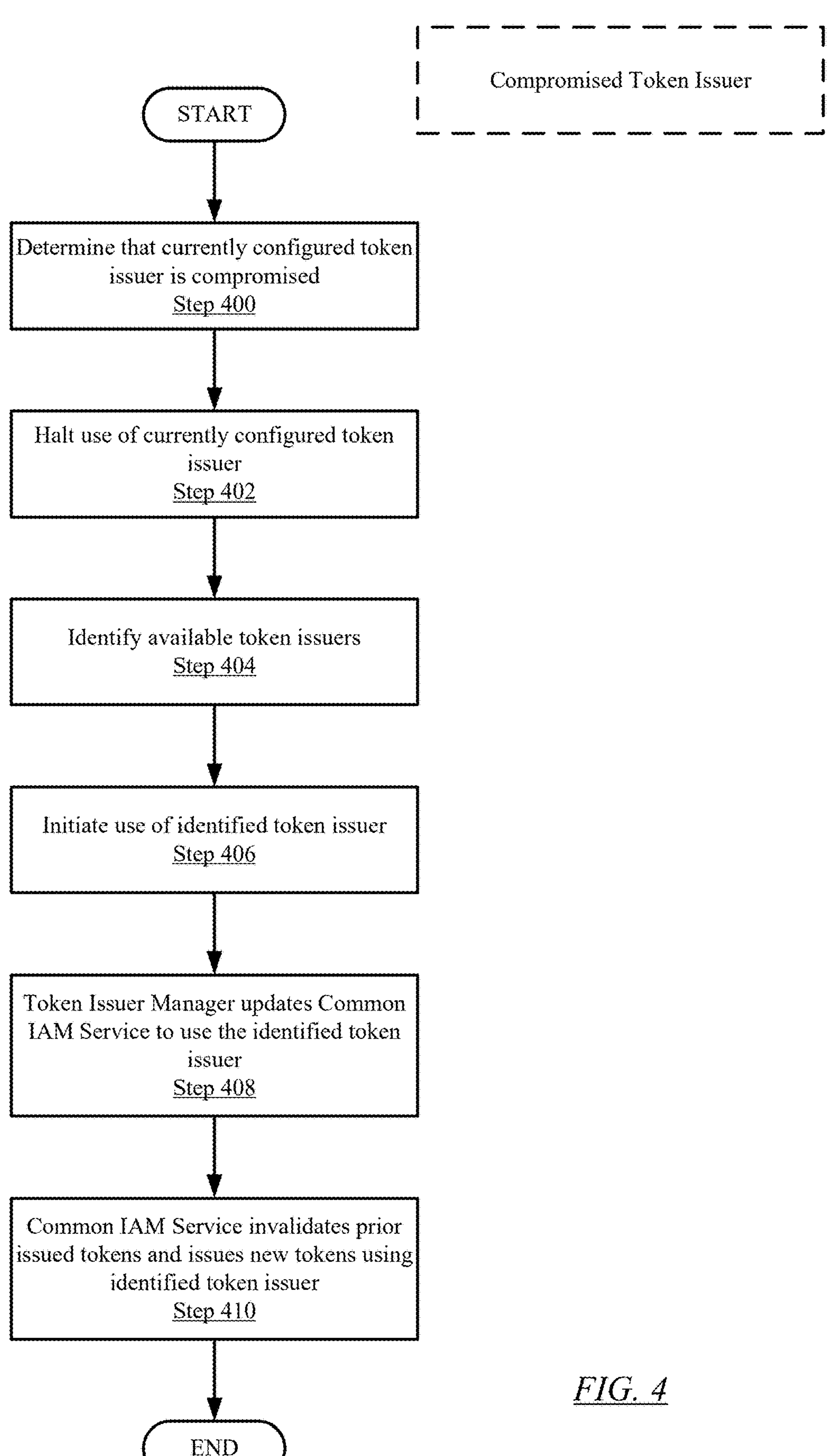
FIG. 4 shows a flowchart of a method for transferring token issuers in accordance with one or more embodiments of the invention.

FIG. 4 shows a flowchart of a method for transferring token issuers in accordance with one or more embodiments of the invention. The method of FIG. 4 may be performed by, for example, the common IAM service (e.g., 101, FIG. 1) and the token issuer manager (e.g., 110, FIG. 1). Other components of the system of FIG. 1 may perform all, or a portion, of the method of FIG. 4 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 4 may be performed in parallel with any other steps shown in FIG. 2-3 and 5 without departing from the scope of the invention.

Turning to FIG. 4, in step 400, a currently configured token issuer on the system is determined to be compromised. For example, the currently configured token issuer is facing a security threat such as a cyber attack or a vulnerability of the currently configured token issuer has been discovered. The security threat may impact the functionality of the currently configured token issuer and threatens the integrity of the system. The currently configured token issuer may be, for example, an external token issuer such as the external token issuer A (102A) as shown in FIG. 1. In one or more embodiments, the currently configured token issuer is the approved external token issuer as shown in FIG. 2. To protect the system, the currently configured token issuer needs to be replaced with another token issuer.

In step 402, the use of the currently configured token issuer is halted. Use is halted in response to the determination that the currently configured token issuer is compromised. The token issuer manager updates the common IAM service to stop using the currently configured token issuer. The token issuer manager also ends the connection with the currently configured token issuer.

In step 404, available token issuers are identified. The token issuer manager identifies all available token issuers accessible to the system. The token issuer manager identifies the available token issuers by determining if a connection can be established between the token issuer manager and the various token issuers.

In step 406, use of an identified token issuer is initiated. A new token issuer, the identified token issuer, is selected. The identified token issuer is selected from one of the available token issuers. In one embodiment, the identified token issuer is a second external token issuer. In another embodiment, the identified token issuer is the native token issuer.

In step 408, the token issuer manager updates the common IAM service to use the identified token issuer. The token issuer manager establishes a connection to the identified token issuer. The token issuer manager is then configured with the identified token issuer. The connection allows for the transmission of authentication requests to the identified token issuer. The identified token issuer is used by the common IAM service to grant access to applications executing on the system by issuing tokens as described in FIG. 2. The common IAM service is set up to act as a stable interface between the identified token issuer and the application.

In step 410, the common IAM service invalidates previously issued tokens and issues new tokens using the identified token issuer. More specifically, the common IAM service, invalidates all tokens issued by the comprised token issuer. This then triggers the applications using the invalidated tokens send authorization requests for new tokens to the common IAM service as shown in FIG. 2.

FIG. 5 shows a flowchart of a method for transferring token issuers in accordance with one or more embodiments of the invention. The method of FIG. 5 may be performed by, for example, the common IAM service (e.g., 101, FIG. 1) and the token issuer manager (e.g., 110, FIG. 1). Other components of the system of FIG. 1 may perform all, or a portion, of the method of FIG. 5 without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 5 may be performed in parallel with any other steps shown in FIG. 2-4 without departing from the scope of the invention.

Turning to FIG. 5, in step 500, a currently configured token issuer is determined to be down. The currently configured token issuer may be an external token issuer such as the external token issuer A (102A) as shown in FIG. 1. In one or more embodiments, the currently configured token issuer is the approved external token issuer as shown in FIG. 2. Because the currently configured token issuer is down, it is unavailable to issue new tokens and, as such, administrators will be unable to execute critical functions on the system and the users of the system will not be able to use applications that do not have an active token. To allow the administrators and the users full access to the system, the currently configured token issuer needs to be replaced with another token issuer.

In step 502, available token issuers are identified. The available token issuers are identified in response to the determination that the currently configured token issuer is compromised. The token issuer manager identifies all available token issuers accessible to the system. The token issuer manager identifies the available token issuers by determining if a connection can be established between the token issuer manager and the various token issuers.

In step 504, use of an identified token issuer is initiated. A new token issuer, the identified token issuer, is selected. The identified token issuer is selected from one of the available token issuers. In one embodiment, the identified token issuer is a second external token issuer. In another embodiment, the identified token issuer is the native token issuer.

In step 506, token issuer manager updates the common IAM service to use the identified token issuer. The token issuer manager establishes a connection to the identified token issuer. The token issuer manager is then configured with the identified token issuer. The connection allows for the transmission of authentication requests to the identified token issuer.

In step 508, common IAM service services new authentication requests using the identified token issuer. The identified token issuer is used by the common IAM service to grant access to applications executing on the system by issuing tokens as described in FIG. 2. The common IAM service is set up to act as a stable interface between the identified token issuer and the application.

As discussed above, embodiments of the invention may be implemented using computing devices. FIG. 6 shows a diagram of a computing device in accordance with one or more embodiments of the invention. The computing device may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the processor(s) (602) may be an integrated circuit for processing instructions. For example, the computer processor(s) may be one or more cores or micro-cores of a processor. The computing device may also include one or more input devices (610), such as a touchscreen, keyboard, mouse, microphone, touchpad, electronic pen, or any other type of input device. Further, the communication interface (612) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the invention, the computing device may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

The problems discussed above should be understood as being examples of problems solved by embodiments of the invention disclosed herein and the invention should not be limited only to solving the same/similar problems. The disclosed invention is broadly applicable to address a range of problems beyond those discussed herein.

Specific embodiments are described with reference to the accompanying figures. In the above description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the prior description of the figures, any component described with regard to a figure, in various embodiments of the invention, may be equivalent to one or more like-named components described with regard to any other figure. For brevity, descriptions of these components are not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase ‘operatively connected’ may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing token issuers, comprising:

initiating use of an approved external token issuer on a system after a factory configuration;

updating, in response to the initiating and by a token issuer manager, a common identity access manager (IAM) service to use the approved external token issuer;

after the updating of the token issuer manager to use the approved external token issuer:

receiving, by the common IAM service, an authentication request from an application executing on the system;

obtaining, by the token issuer manager and from the common IAM, the authentication request;

forwarding the authentication request to the approved external token issuer;

receiving a token from the approved external token issuer, wherein the token is used to service the authentication request;

after servicing the authentication request and in a disaster situation of the system:

restoring the system on a virtual machine environment based on a backup image of the system;

after the restoring:

identifying available token issuers on the virtual machine environment;

determining that a currently configured token issuer on the system is not one of the available token issuers, wherein the currently configured token issuer is the approved external token issuer;

selecting, in response to the determining, a token issuer of the available token issuers;

updating, by the token issuer manager executing on the system, the common AM service of the system to use the token issuer; and after the updating, using the token issuer by the common IAM service to grant access to the application executing on the system.

2. The method of claim 1, wherein the factory configuration specifies the approved external token issuer and that the common IAM service uses a native token issuer.

3. The method of claim 2, wherein the approved external token issuer is not available on the system when the factory configuration is generated.

4. The method of claim 1, wherein the currently configured token issuer is the approved external token issuer.

5. The method of claim 1, wherein the token issuer is a second external token issuer.

6. The method of claim 1, wherein the token issuer is a native token issuer executing on the virtual machine environment and the currently configured token issuer is an external token issuer.

7. The method of claim 1, wherein the currently configured token issuer is an external token issuer and wherein the token issuer is a second external token issuer.

8. A method for managing token issuers, comprising:

initiating use of an approved external token issuer on a system after a factory configuration;

updating, in response to the initiating and by a token issuer manager, a common identity access manager (IAM) service to use the approved external token issuer;

after the updating of the token issuer manager to use the approved external token issuer:

receiving, by the common IAM service, an authentication request from an application executing on the system;

obtaining, by the token issuer manager and from the common IAM, the authentication request;

forwarding the authentication request to the approved external token issuer;

receiving a token from the approved external token issuer, wherein the token is used to service the authentication request;

after servicing the authentication request:

determining that a currently configured token issuer executing on the system has been compromised, wherein the currently configured token issuer is the approved external token issuer;

in response to the determination:

halting use of the currently configured token issuer;

identifying available token issuers accessible by the system;

selecting, in response to the identification, a token issuer of the available token issuers;

updating, by the token issuer manager executing on the system, the common IAM service of the system to use the token issuer; and after the updating, invalidating tokens previously issued by the currently configured token issuer; and using the token issuer by the common IAM service to grant access to the application executing on the system.

9. The method of claim 8, wherein the factory configuration specifies the approved external token issuer and that the common IAM service uses a native token issuer.

10. The method of claim 9, wherein the approved external token issuer is not available on the system when the factory configuration is generated.

11. The method of claim 8, wherein the currently configured token issuer is the approved external token issuer.

12. The method of claim 8, wherein the token issuer is a second external token issuer.

13. The method of claim 8, wherein the token issuer is a native token issuer executing on the system and the currently configured token issuer is an external token issuer.

14. The method of claim 8, wherein the currently configured token issuer is an external token issuer and wherein the token issuer is a second external token issuer.

15. A method for managing token issuers, comprising:

initiating use of an approved external token issuer on a system after a factory configuration;

updating, in response to the initiating and by a token issuer manager, a common identity access manager (IAM) service to use the approved external token issuer;

after the updating of the token issuer manager to use the approved external token issuer:

receiving, by the common IAM service, an authentication request from an application executing on the system;

obtaining, by the token issuer manager and from the common IAM, the authentication request;

forwarding the authentication request to the approved external token issuer;

receiving a token from the approved external token issuer, wherein the token is used to service the authentication request;

after servicing the authentication request:

determining that a currently configured token issuer executing on the system is unavailable, wherein the currently configured token issuer is the approved external token issuer;

in response to the determination:

identifying available token issuers accessible by the system;

selecting, in response to the identification, a token issuer of the available token issuers;

updating, by the token issuer manager executing on the system, the common IAM service of the system to use the token issuer; and after the updating, using the token issuer by the common IAM service to grant access to the application executing on the system.

16. The method of claim 15, wherein the factory configuration specifies the approved external token issuer and that the common IAM service uses a native token issuer.

17. The method of claim 16, wherein the approved external token issuer is not available on the system when the factory configuration is generated.

* * * * *